(12) United States Patent
Merkel et al.

(10) Patent No.: US 12,354,093 B2
(45) Date of Patent: Jul. 8, 2025

(54) SYSTEMS, METHODS, AND APPARATUSES FOR TRACKING AND LOGGING RESOURCE TRANSFERS VIA A DISTRIBUTED NETWORK

(71) Applicant: BANK OF AMERICA CORPORATION, Charlotte, NC (US)

(72) Inventors: Brady Prentice Merkel, Jacksonville Beach, FL (US); Terrence Williamson, Elgin, SC (US); Mardochee Macxis, Concord, NC (US); Anup Philip, Charlotte, NC (US); Richard Huw Thomas, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 82 days.

(21) Appl. No.: 17/942,832

(22) Filed: Sep. 12, 2022

(65) Prior Publication Data
US 2024/0086911 A1    Mar. 14, 2024

(51) Int. Cl.
G06Q 20/00    (2012.01)
G06Q 20/38    (2012.01)

(52) U.S. Cl.
CPC ....... *G06Q 20/389* (2013.01); *G06Q 2220/10* (2013.01)

(58) Field of Classification Search
CPC .................................................. G06Q 20/389
See application file for complete search history.

(56) References Cited

U.S. PATENT DOCUMENTS

| | | | |
|---|---|---|---|
| 8,037,193 B2 * | 10/2011 | Hay | G06Q 30/06 725/23 |
| 8,589,255 B2 | 11/2013 | Glazer et al. | |
| 9,229,987 B2 | 1/2016 | Mattsson et al. | |
| 10,540,654 B1 | 1/2020 | James et al. | |
| 11,054,901 B2 | 7/2021 | Peters | |
| 11,139,955 B1 | 10/2021 | So et al. | |
| 11,308,487 B1 | 4/2022 | Foster et al. | |

(Continued)

FOREIGN PATENT DOCUMENTS

| CA | 3177552 | 9/2022 |
|---|---|---|
| KR | 102388302 | 4/2022 |

(Continued)

OTHER PUBLICATIONS

Secure Platform as a Service Using Blockchain Technology (Hyperbase), IEEE (Year: 2023).*

(Continued)

*Primary Examiner* — Bruce I Ebersman
(74) *Attorney, Agent, or Firm* — Moore & Van Allen PLLC; Lauren M. Stokes (57) ABSTRACT

Systems, computer program products, and methods are described herein for tracking and logging resource transfers in a distributed network. The present invention is configured to generate a distributed ledger associated with a resource identifier; receive a resource transfer associated with the resource identifier, the resource transfer comprising a resource transfer between a sender account and a recipient account; update the distributed ledger based on the resource transfer; and generate a resource token based on the distributed ledger.

10 Claims, 6 Drawing Sheets

(56) References Cited

U.S. PATENT DOCUMENTS

| | | | |
|---|---|---|---|
| 11,334,875 B2 | 5/2022 | Yantis et al. | |
| 11,412,011 B1* | 8/2022 | Benjamin | H04L 67/02 |
| 11,522,700 B1* | 12/2022 | Auerbach | H04L 9/3213 |
| 2006/0036593 A1* | 2/2006 | Dean | G06F 16/30 |
| 2015/0095367 A1* | 4/2015 | Mattsson | H04L 9/3213 |
| | | | 707/769 |
| 2017/0103385 A1 | 4/2017 | Wilson et al. | |
| 2021/0082044 A1* | 3/2021 | Sliwka | H04L 9/3255 |
| 2021/0266167 A1* | 8/2021 | Lohe | G06Q 20/10 |
| 2021/0287195 A1* | 9/2021 | Prakash | G06Q 30/0641 |
| 2022/0198562 A1* | 6/2022 | Cella | G06Q 40/04 |
| 2022/0245574 A1* | 8/2022 | Cella | G06Q 10/087 |
| 2022/0292588 A1 | 9/2022 | Collen | |
| 2022/0294629 A1 | 9/2022 | Collen et al. | |
| 2022/0294630 A1 | 9/2022 | Collen | |
| 2022/0366494 A1* | 11/2022 | Cella | H04L 9/50 |
| 2023/0078448 A1* | 3/2023 | Cella | G06Q 10/06311 |
| | | | 705/7.13 |
| 2023/0083724 A1* | 3/2023 | Cella | G06Q 20/389 |
| | | | 705/28 |
| 2023/0102048 A1* | 3/2023 | Cella | B25J 9/1661 |
| | | | 700/248 |
| 2023/0127651 A1* | 4/2023 | Cella | G06Q 30/0201 |
| | | | 705/7.11 |
| 2023/0173395 A1* | 6/2023 | Cella | G06N 3/09 |
| | | | 463/25 |

FOREIGN PATENT DOCUMENTS

| | | |
|---|---|---|
| KR | 102472008 | 11/2022 |
| KR | 102475823 | 12/2022 |

OTHER PUBLICATIONS

An Overview on Blockchain for Smartphones: State-of-the-Art, Consensus, Implementation, Challenges and Future Trends, IEEE (Year: 2020).*

* cited by examiner

SYSTEMS, METHODS, AND APPARATUSES FOR TRACKING AND LOGGING RESOURCE TRANSFERS VIA A DISTRIBUTED NETWORK

FIELD OF THE INVENTION

The present invention embraces a system for tracking and logging resource transfers in a distributed network.

BACKGROUND

Consumers, owners, and/or individuals dealing in different transaction environments may wish to keep track of their resources in a secure, accurate, and efficient manner. For instance, and where a resource can be transferred in a real-world environment and/or in a virtual environment, such as the metaverse or a similar virtual reality environment, the owner of the resource may have difficulty keeping a centralized tracking of the resource between the different environments. A need, therefore, exists for a system to track and log resource transfers across different environments, where the tracking and logging are done in real-time in a secure, accurate, and efficient manner.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for tracking and logging resource transfers is provided. The system may comprise: a memory device with computer-readable program code stored thereon; at least one processing device operatively coupled to the at least one memory device and the at least one communication device, wherein executing the computer-readable code is configured to cause the at least one processing device to: generate a distributed ledger associated with a resource identifier; receive a resource transfer associated with the resource identifier, the resource transfer comprising a resource transfer between a sender account and a recipient account; update the distributed ledger based on the resource transfer; and generate a resource token based on the distributed ledger.

In some embodiments, the resource transfer is a real-world transaction.

In some embodiments, the resource transfer is a virtual transaction. In some embodiments, the resource token is used in the virtual transaction, the resource token comprising a virtual resource associated with a current resource of the resource identifier. In some embodiments, the processing device is further configured to: track the virtual transaction; generate an updated resource token comprising a portion of the virtual resource, wherein the portion of the virtual resource is based on the virtual transaction of the virtual resource; and update the distributed ledger based on the portion of the virtual resource.

In some embodiments, the distributed ledger is a federated distributed ledger, the federated distributed ledger comprising access by at least one of a plurality of resource transfer entities.

In some embodiments, the processing device is further configured to generate a resource transfer interface component to configure a graphical user interface of a user device associated with at least one of a sender account or a recipient account, wherein the resource transfer interface component comprises data associated with the resource transfer.

In some embodiments, the processing device is further configured to: generate a plurality of distributed ledgers associated with a sender account identifier, the plurality of distributed ledgers associated with the sender account identifier comprising data of a plurality of resources of the sender account; and update the plurality of distributed ledgers associated with the sender account identifier based on a plurality of resource transfers from the sender account to a plurality of recipient accounts.

In some embodiments, the processing device is further configured to: generate a plurality of distributed ledgers associated with a recipient account identifier, the plurality of distributed ledgers associated with the recipient account identifier comprising data of a plurality of resources of the recipient account; and update the plurality of distributed ledgers associated with the recipient account identifier based on a plurality of resource transfers to the recipient account from a plurality of sender accounts.

In another aspect, a computer program product for tracking and logging resource transfers is provided. The computer program product may comprise at least one non-transitory computer-readable medium having computer-readable program code portions embodied therein, the computer-readable program code portions which when executed by a processing device are configured to cause the processor to: generate a distributed ledger associated with a resource identifier; receive a resource transfer associated with the resource identifier, the resource transfer comprising a resource transfer between a sender account and a recipient account; update the distributed ledger based on the resource transfer; and generate a resource token based on the distributed ledger.

In some embodiments, the resource transfer is a real-world transaction.

In some embodiments, the resource transfer is a virtual transaction. In some embodiments, the resource token is used in the virtual transaction, the resource token comprising a virtual resource associated with a current resource of the resource identifier. In some embodiments, the processing device processing device is further configured to: track the virtual transaction; generate an updated resource token comprising a portion of the virtual resource, wherein the portion of the virtual resource is based on the virtual transaction of the virtual resource; and update the distributed ledger based on the portion of the virtual resource.

In some embodiments, the distributed ledger is a federated distributed ledger, the federated distributed ledger comprising access by at least one of a plurality of resource transfer entities.

In another aspect, a computer-implemented method for tracking and logging resource transfers is provided. The computer-implemented method may comprise: generating a distributed ledger associated with a resource identifier; receiving a resource transfer associated with the resource identifier, the resource transfer comprising a resource transfer between a sender account and a recipient account; updating the distributed ledger based on the resource transfer; and generating a resource token based on the distributed ledger.

In some embodiments, the resource transfer is a real world transaction.

In some embodiments, the resource transfer is a virtual transaction. In some embodiments, the resource token is used in the virtual transaction, the resource token comprising a virtual resource associated with a current resource of the resource identifier. In some embodiments, the computer-implemented method further comprising: tracking the virtual transaction; generating an updated resource token comprising a portion of the virtual resource, wherein the portion of the virtual resource is based on the virtual transaction of the virtual resource; and updating the distributed ledger based on the portion of the virtual resource.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As described in further detail herein, the present invention provides a solution to the above-referenced problems in the field of technology by generating an accurate, efficient, and secure system for tracking and logging resource transfers. Such a system (e.g., a resource tracking and logging system) may track a plurality of resources as they are transferred within different environments, such as within a real-world environment and/or virtual environments, and logging the resource transfers within a plurality of distributed ledgers. The present invention solves the technical problem by implementing a resource tracking and logging system, like that shown in FIGS. 1A-1C. For instance, the resource tracking and logging system acts by generating a distributed ledger associated with a resource identifier and receiving a resource transfer associated with the resource identifier, where the resource transfer may comprise a resource transfer between a sender account and a recipient account. The resource tracking and logging system may further act by updating the distributed ledger based on the resource transfer and generating a resource token based on the updated distributed ledger.

Accordingly, the present invention works by the resource tracking and logging system tracking transactions in both a real-world environment and in a virtual environment, and updating a distributed ledger of the resource based on each resource transfer. By way of non-limiting example, the resource tracking and logging system may mirror the transactions between the environments such that the resource transfers are tracked in one place and the log of the resource (i.e., the distributed ledger) is updated, in real-time. The system may further generate a resource token (e.g., an NFT) based on the distributed ledger, which may be used in both the real world and/or in the virtual environment.

What is more, the present invention provides a technical solution to a technical problem. As described herein, the technical problem includes the inability of prior systems to accurately track and log resource transfers between different environments. The technical solution presented herein allows for the accurate, secure, and efficient tracking and logging of resource transfers in a distributed ledger. In particular, the resource tracking and logging system is an improvement over existing solutions to the resource tracking and logging process, (i) with fewer steps to achieve the solution, thus reducing the amount of computing resources, such as processing resources, storage resources, network resources, and/or the like, that are being used to track and log resources and the associated resource transfers; (ii) providing a more accurate and real-time solution to problem, thus reducing the number of resources required to remedy any errors made due to a less accurate solution; (iii) removing manual input and waste from the implementation of the solution, thus improving speed and efficiency of the process and conserving computing resources; (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
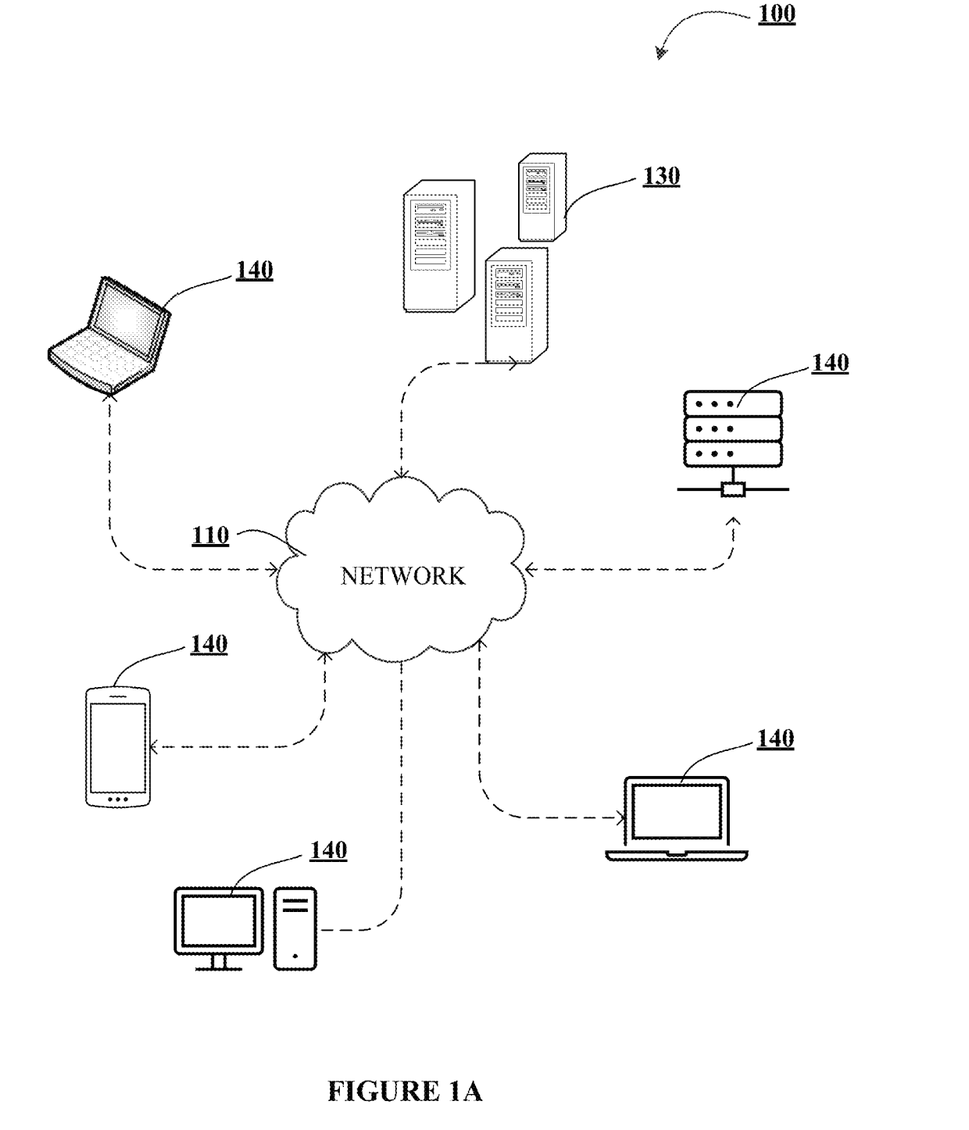
FIGS. 1A-1C illustrates technical components of an exemplary distributed computing environment for tracking and logging resource transfers in a distributed network, in accordance with an embodiment of the invention.
Figure 1B:
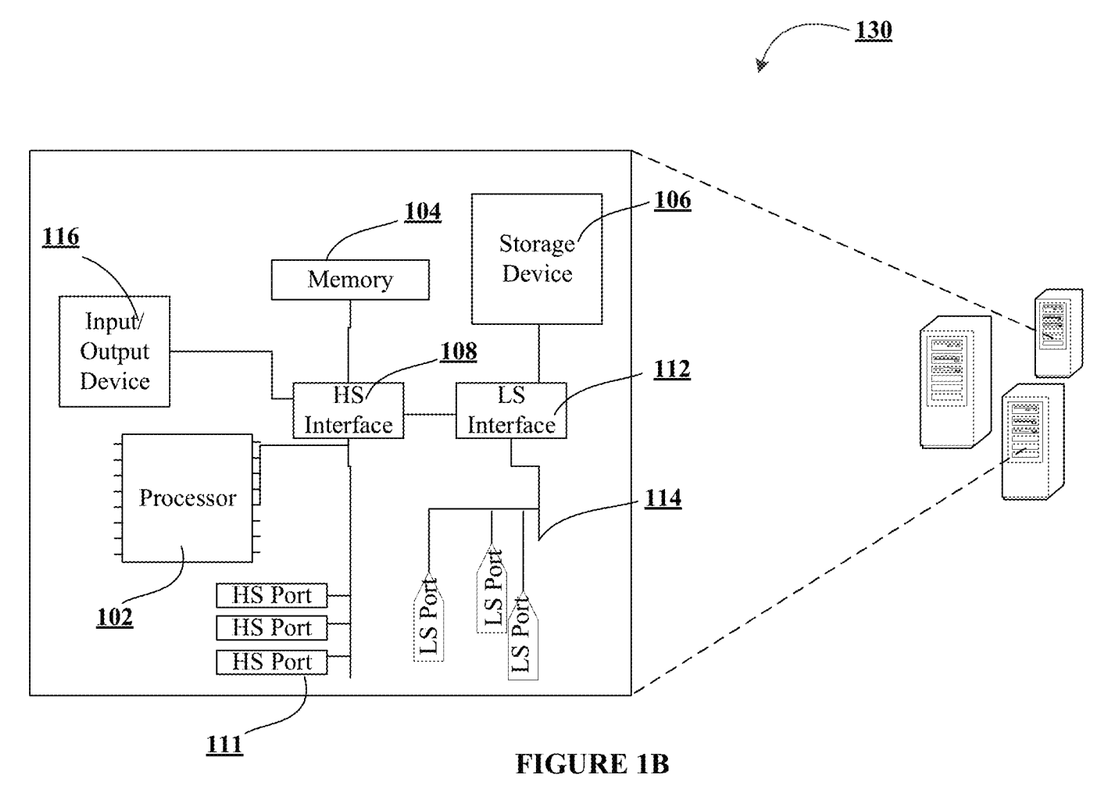
Figure 1C:
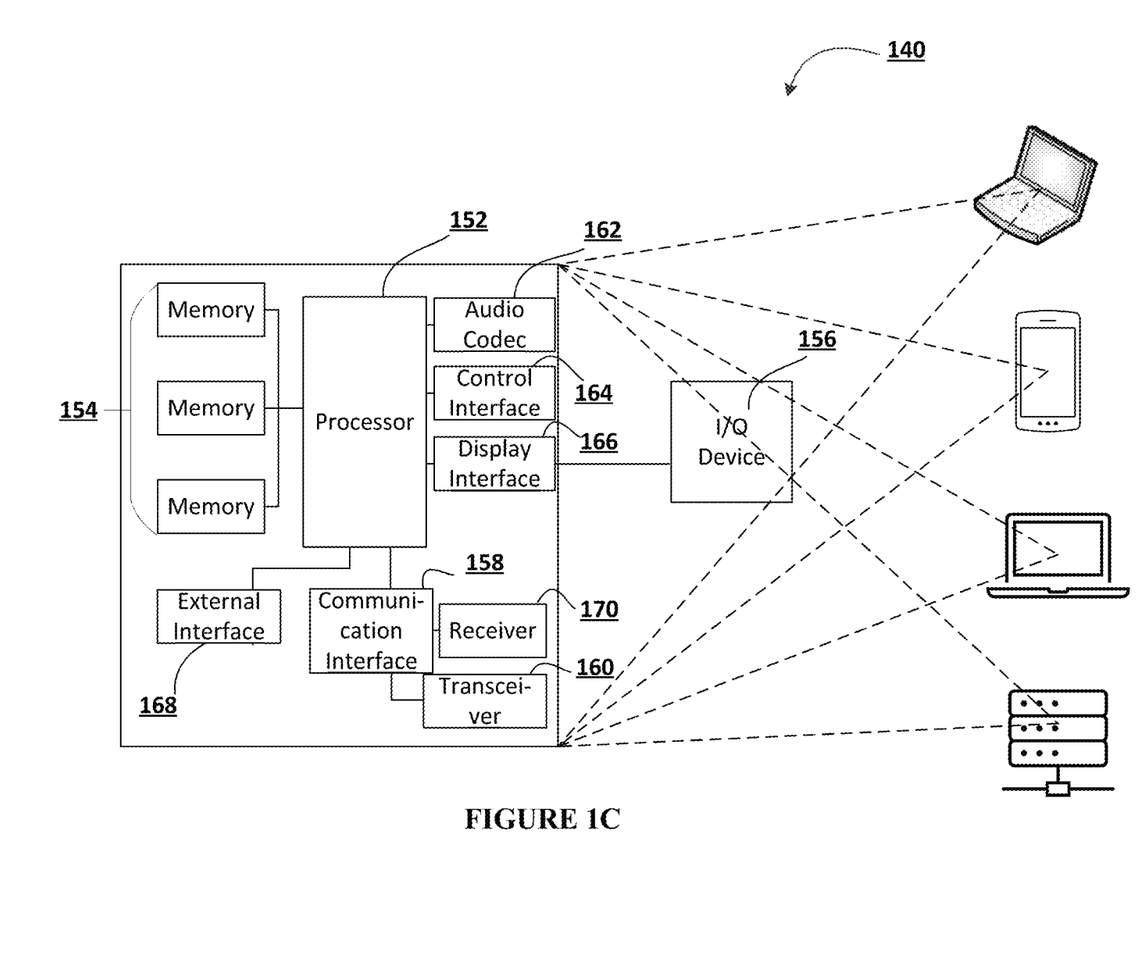

FIGS. 1A-1C illustrate technical components of an exemplary distributed computing environment for tracking and logging resource transfers via a distributed network 100, in accordance with an embodiment of the invention. As shown in FIG. 1A, the distributed computing environment 100 contemplated herein may include a system 130 (i.e., a resource tracking and logging system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
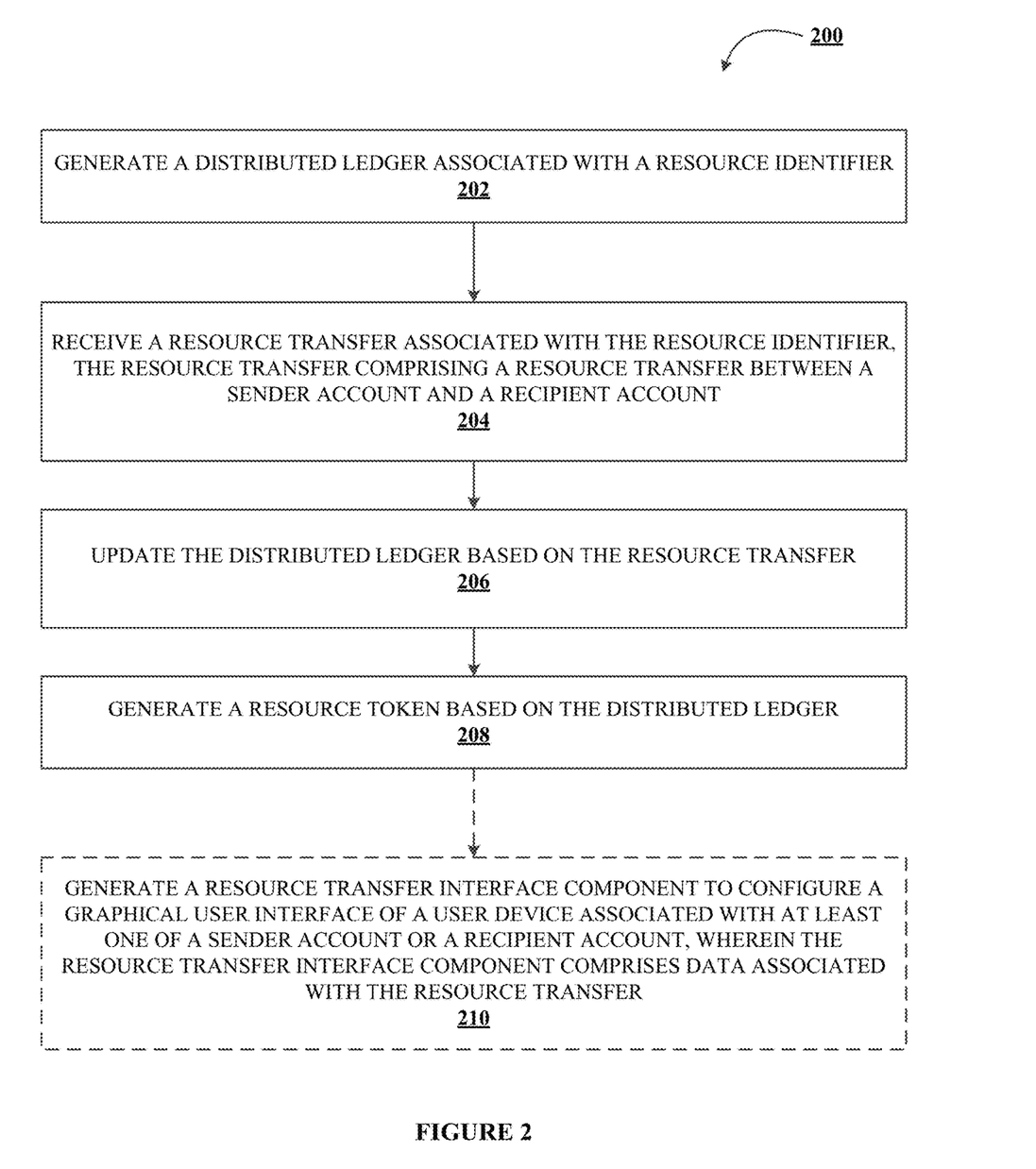
FIG. 2 illustrates a process flow for tracking and logging resource transfers in a distributed network, in accordance with an embodiment of the invention.

FIG. 2 illustrates a process flow 200 for tracking and logging resource transfers via a distributed network, in accordance with an embodiment of the invention. In some embodiments, a system (e.g., similar to one or more of the systems described herein with respect to FIGS. 1A-1C) may perform one or more of the steps of process flow 200. For example, a resource tracking and logging system (e.g., the system 130 described herein with respect to FIG. 1A-1C) may perform the steps of process 200.

As shown in block 202, the process flow 200 may include the step of generating a distributed ledger associated with a resource identifier. By way of non-limiting example, the resource tracking and logging system may generate a distributed ledger based on data associated with a resource, where the resource may be associated with a resource identifier and where the resource identifier may be stored within the distributed ledger. In some embodiments, the resource identifier may be used by the resource tracking and logging system to identify the correct distributed ledger for the resource. By way of non-limiting example, the distributed ledger may track the events associated with the resource by adding blocks and entries to the distributed ledger whenever an event of the resource occurs, such as where a portion of a resource (e.g., a portion of a monetary resource) is used and/or spent, where the resource is transferred (or a portion of the resource is transferred), where an update of the owner of the resource occurs, and/or the like In some embodiments, the distributed ledger is a federated distributed ledger. In some embodiments, and by way of non-limiting example, the federated distributed ledger may be accessed by a plurality of entities, such as a plurality of resource transfer entities which may be used to track the resource transfers of a plurality of resources associated with a plurality of distributed ledgers. In some embodiments, the federated distributed ledger may be updated by each of the plurality of resource transfer entities, where each resource transfer entity may have its own set of privileges to access and update the distributed ledgers without prior consent by the current owner of the resource. In some embodiments, the resource transfer entities may comprise any of a financial institution associated with the sender account, a financial institution associated with the recipient account, a financial institution within or associated with the virtual environment, and/or the like.

As shown in block 204, the process flow 200 may include the step of receiving a resource transfer associated with the resource identifier, the resource transfer comprising a resource transfer between a sender and a recipient account. In some embodiments, the resource tracking and logging system may receive a resource transfer (and/or an indication indicating a resource transfer has occurred) associated with a resource identifier, where the resource e transfer may have occurred from a sender account to a recipient account. In some embodiments, the resource transfer may be indicated to the resource tracking and logging system by the resource tracking and logging system receiving a resource transfer identifier, where the resource transfer identifier may comprise data regarding at least one of the amount of the resource transfer, the sender account identifier, the recipient account identifier, the time of the resource transfer (e.g., a timestamp), and/or the like.

In some embodiments, the resource transfer may be a real-world transaction. By way of non-limiting example, such a resource transfer may comprise a transfer of real resources such as money, objects, products, real estate, devices, goods, commodities, services, and/or the like.

In some embodiments, the resource transfer may be a virtual transaction. By way of non-limiting example, the virtual transaction may comprise a transfer of resources in a virtual environment, such as within the metaverse and/or other virtual reality. In some embodiments, the virtual transaction which occurs in a virtual environment may comprise virtual resources such as virtual money, virtual objects, virtual products, virtual real estate, virtual devices, virtual goods, virtual services, virtual commodities, and/or the like. By way of non-limiting example, such virtual resources may be computer or computer source code based. In some embodiments, the virtual resources may be a virtual rendition of real-world resources, such that the virtual resource has a similar appearance and/or a similar makeup to the real-world resource.

As shown in block 206, the process flow 200 may include the step of updating the distributed ledger based on the resource transfer. In some embodiments, the resource tracking and logging system may update the distributed ledger by adding an entry and/or a block at each instance a resource transfer occurs. In this manner, the resource tracking and logging system may track each resource transfer of the resource, and in real time, track the leftover portions of the resource after each transfer.

In some embodiments—and where a resource has both a real-world resource and a virtual resource—as one of the real-world resource or the virtual resource is bought and/or a transfer occurs, then the resource tracking and logging system may likewise indicate the parallel transfer of the virtual resource or real-world resource. By way of non-limiting example, if a real-world resource is transferred from a sender account to a recipient account and a distributed ledger is updated to indicate the real-world transfer, then the resource tracking and logging system may likewise update the distributed ledger of the parallel virtual resource to indicate a virtual transaction of the virtual resource associated with the real-world resource. In this manner, the distributed ledgers of the real-world resource and the virtual resource are updated in parallel.

As shown in block 208, the process flow 200 may include the step of generating a resource token based on the distributed ledger. By way of non-limiting example, the resource tracking and logging system may generate a resource token based on the distributed ledger (e.g., the updated distributed ledger after the latest resource transfer). By way of non-limiting example, and where a resource transfer has occurred (e.g., real-world transaction and/or virtual transaction), then a resource token such as a non-fungible token ("NFT") may be generated as a digital certificate to show the current state of the resource, such as the current amount leftover of the resource after the resource transfer. In some embodiments, and where only a portion of the resource was transferred in the most-recent resource transfer, the resource token may comprise data indicating that a left-over portion of the resource is presently owned by the resource owner (e.g., the sender account). Such an embodiment is described in further detail below with respect to FIG. 3.

In some embodiments, and where a virtual transaction occurs for a virtual resource that has an associated real-world resource (i.e., a parallel real-world resource), then the resource tracking and logging system may generate a resource token based on both the virtual resource and the real-world resource, which comprise the same resource data (e.g., same resource portion and/or resource amount, same current owner, and/or the like). In some embodiments, the same resource portion and/or resource amount may be indicated as a current resource and may show the parallel resource as it is updated between the virtual resource and the real-world resource. By way of non-limiting example, the current resource may show the overall resource data as the resource is transferred in both a real-world transaction and/or in a virtual transaction, where the current resource may comprise data of the resource in real-time and between transaction environments (i.e., virtual environment and real-world environment).

In some embodiments, and as shown in block 210, the process flow 200 may include the step of generating a resource transfer interface component to configure a graphical user interface of a user device associated with at least one of a sender account or a recipient account, wherein the resource transfer interface component comprises data associated with the resource transfer. By way of non-limiting example, the resource tracking and logging system may generate a resource transfer interface component to indicate that a resource transfer has occurred and may transmit the resource transfer interface component from the resource tracking and logging system to a user device, such as a user device associated with a sender account, a recipient account, and/or the like. In some embodiments, the resource tracking and logging system may transmit the resource transfer interface component over a network, such as network 110.

In some embodiments, the resource tracking and logging system may transmit the resource transfer interface component to a user device to configure the graphical user interface of the user device to show the data associated with the resource transfer. By way of non-limiting example, the resource transfer interface component may comprise data associated with the resource transfer such as data regarding the sender account (e.g., a sender account identifier), the recipient account (e.g., a recipient account identifier), the resource transfer (e.g., the amount of the resource transfer), the time of the resource transfer (e.g., date and time of day), and/or the like. In some embodiments, the resource transfer interface component may comprise a link, such as a hyperlink or a universal resource locator ("URL"), that may allow a user viewing the resource transfer interface component to click the link and be routed to a different interface component comprising secure data regarding the resource transfer (e.g., like that described above). In some embodiments, the interface component leading to the secured data regarding the resource transfer may request authentication credentials of the user before rendering the data regarding the resource transfer.

Figure 3:
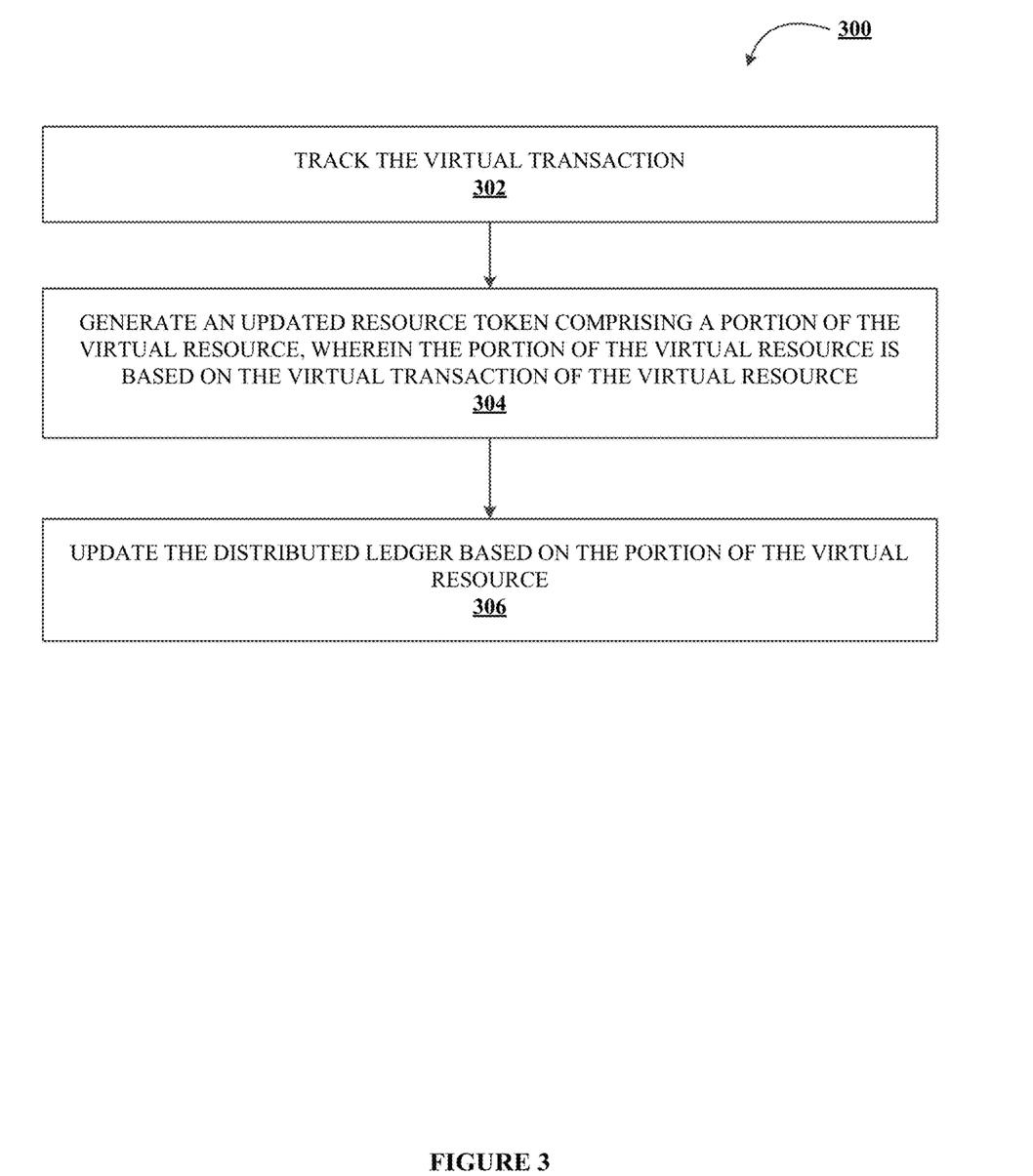
FIG. 3 illustrates a process flow for updating a distributed ledger based on an updated resource token, in accordance with an embodiment of the invention.

FIG. 3 illustrates a process flow 300 for updating a distributed ledger based on an updated resource token, in accordance with an embodiment of the invention. In some embodiments, a system (e.g., similar to one or more of the systems described herein with respect to FIGS. 1A-1C) may perform one or more of the steps of process flow 300. For example, a resource tracking and logging system (e.g., the system 130 described herein with respect to FIG. 1A-1C) may perform the steps of process 300.

As shown in block 302, the process flow 300 may include the step of tracking the virtual transaction. In some embodiments, the step of tracking the virtual transaction may occur based on the resource token being used in a virtual transaction and the resource token comprising a virtual resource associated with a current resource. In some embodiments, the tracking of the virtual transaction may comprise receiving, by the resource tracking and logging system, an indication that a virtual transaction of the resource has occurred. Such an indication may comprise data regarding the virtual transaction, such as the data indicating the resource involved in the resource transfer (e.g., such as a resource identifier to identify the resource transferred), a time of the virtual transaction, a sender account (e.g., sender account identifier), a recipient account (e.g., a recipient account identifier), and/or the like.

As shown in block 304, the process flow 300 may include the step of generating an updated resource token comprising a portion of the virtual resource, wherein the portion of the virtual resource is based on the virtual transaction of the virtual resource. By way of non-limiting example, the resource tracking and logging system may generate an updated resource token comprising a portion of the virtual resource based on only a portion of the resource being transferred in the virtual transaction. For instance, and where a resource comprises a specific amount (e.g., a specific amount of funds and/or money, which may be used in a virtual transaction and/or a real-world transaction), the resource tracking and logging system may track each resource transfer of the specific amount such that any leftover portion of the resource is likewise tracked.

In some embodiments, the resource tracking and logging system may, in real time, update the resource token to indicate the real time value and/or amount of the resource leftover after the most recent virtual transaction. Similarly, and in some embodiments, the resource tracking and logging system may update the resource token to indicate a real time value and/or an amount of the resource leftover after a real-world transaction. In both embodiments, the updated resource token shows the current resource after the most recent transaction, whether it be a virtual transaction and/or a real-world transaction.

As shown in block 306, the process flow 300 may include the step of updating the distributed ledger based on the portion of the virtual resource. By way of non-limiting example, the resource tracking and logging system may update the distributed ledger to indicate the virtual transaction and the leftover portion of the resource, based on the resource transfer of the virtual transaction (i.e., the virtual transaction of the virtual resource). In some embodiments, the resource tracking and logging system may likewise update the distributed ledger based on the resource transfer in a real-world transaction.

In some embodiments, the virtual resource may be updated (e.g., added to, subtracted therefrom, and/or the like) based on a likewise addition and/or subtraction to the resource in the real-world. In some embodiments, the distributed ledger may be updated based on transfers to the resource (e.g., a deposit of resources to add to the resource amount) and/or transfers from the resource (e.g., a resource transfer from a sender account to a recipient account where the resource amount may be decreased).

Figure 4:
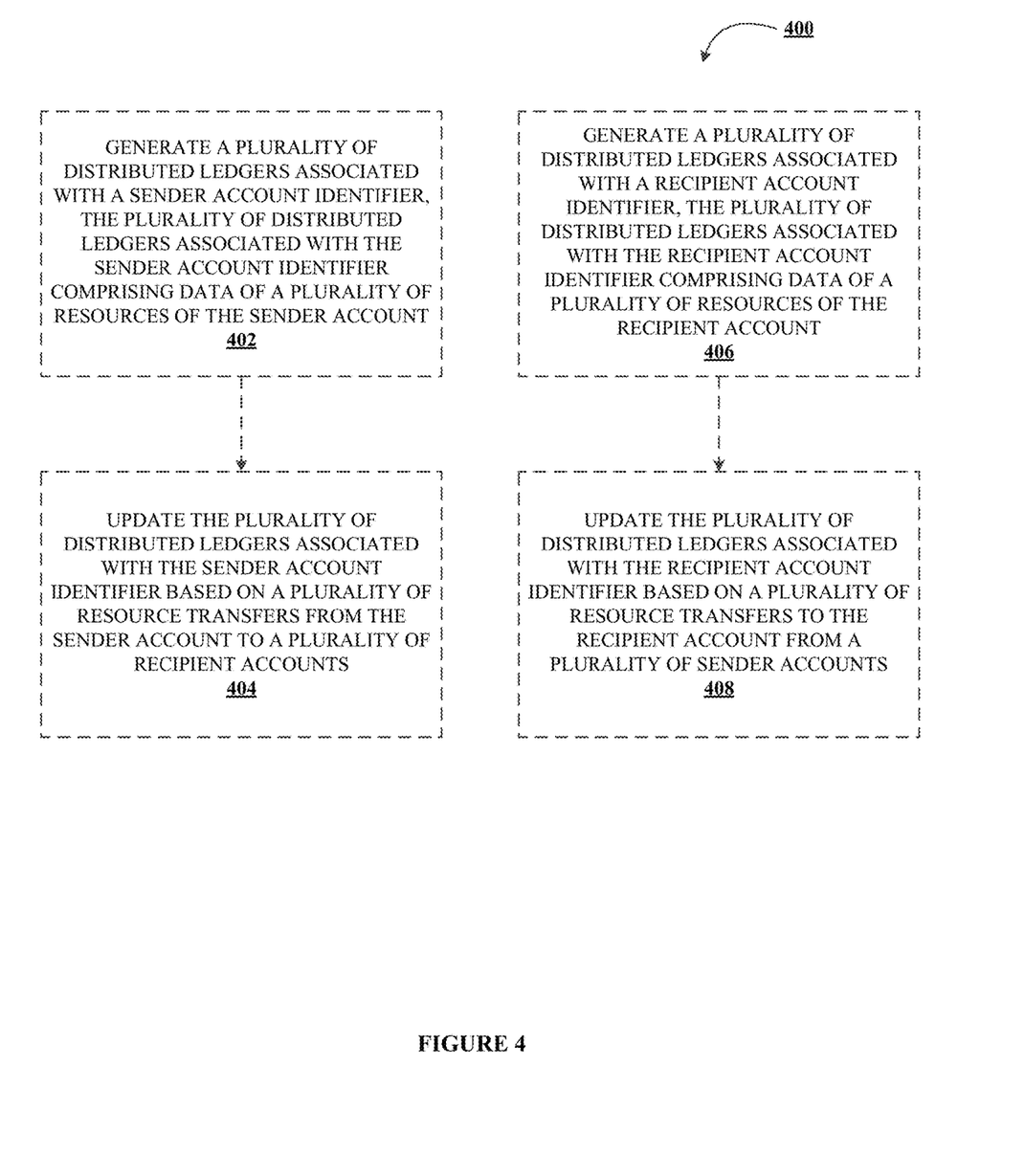
FIG. 4 illustrates a process flow for updating a plurality of distributed ledgers based on a plurality of resource transfers, in accordance with an embodiment of the invention.

FIG. 4 illustrates a process flow 400 for updating a plurality of distributed ledgers based on a plurality of resource transfers, in accordance with an embodiment of the invention. In some embodiments, a system (e.g., similar to one or more of the systems described herein with respect to FIGS. 1A-1C) may perform one or more of the steps of process flow 400. For example, a resource tracking and logging system (e.g., the system 130 described herein with respect to FIG. 1A-1C) may perform the steps of process 400.

In some embodiments, and as shown in block 402, the process flow 400 may include the step of generating a plurality of distributed ledgers associated with a sender account identifier, the plurality of distributed ledgers associated with the sender account identifier comprising data of a plurality of resources of the sender account.

In some embodiments, the resource tracking and logging system may generate the plurality of distributed ledgers associated with a sender account identifier in response to the resource tracking and logging system receiving resource transfers associated with a plurality of resource identifiers. By way of non-limiting example, the resource tracking and logging system may generate each distributed ledger to comprise the full data regarding the resource and each of the associated resource transfers (e.g., to add to the resource, to subtract from the resource, and/or the like).

In some embodiments, and based on each of the generated distributed ledgers, the resource tracking and logging system may generate and determine a plurality of distributed ledgers associated with a sender account identifier. By way of non-limiting example, the resource tracking and logging system may associate each resource and its associated distributed ledger with an account identifier. Such an account identifier may be based on who owns the resource. In some embodiments, the resource tracking and logging system may identify an owner of the resource as a sender account identifier, where the sender account identifier is the account that transfers the resource to a recipient account identifier (i.e., a future owner of the resource). In some embodiments, and where the resource is an account comprising monetary funds, the resource tracking and logging system may identify the owner of the resource as the owner of the account. For instance, and where the resource tracking and logging system identifies each of the resources with a current owner as a sender account, the resource tracking and logging system may generate a plurality of the distributed ledgers that the sender account currently owns. In this manner, the resource tracking and logging system may track the resources and the associated resource transfers for each sender account identifier.

In some embodiments, and as shown in block 404, the process flow 400 may include the step of updating the plurality of distributed ledgers associated with the sender account identifier based on a plurality of resource transfers from the sender account to a plurality of recipient accounts. By way of non-limiting example, the resource tracking and logging system may update the plurality of distributed ledgers associated with the sender account identifier in response to receiving a plurality of resource transfers associated with resources of the sender account. By way of non-limiting example, the resource tracking and logging system may update—in real time—each distributed ledger associated with the sender account identifier based on each resource transfer received, where the resource transfers may comprise a resource transfer from the sender account to a plurality of recipient accounts. By way of non-limiting example, the plurality of resource transfers from the sender account to the plurality of recipient accounts may be used to track all the resource transfers of the resources owned (e.g., currently and/or previously owned) by the sender account.

In some embodiments, and as shown in block 406, the process flow 400 may include the step of generating a plurality of distributed ledgers associated with a recipient account identifier. By way of non-limiting example, the resource tracking and logging system may generate a plurality of distributed ledgers associated with a recipient account identifier, where the resource tracking and logging system may generate and update the plurality of distributed ledgers upon the receipt of a plurality of resource transfers. Similar to the process described with respect to block 402, the resource tracking and logging system may generate each distributed ledger to comprise the full data regarding each resource and each of the associated resource transfers.

By way of non-limiting example, the resource tracking and logging system may associate each resource and its associated distributed ledger with an account identifier. Such an account identifier may be based on who owns and receives the resource. In some embodiments, the resource tracking and logging system may identify an owner of the resource as a recipient account identifier, where the recipient account identifier is the account that receives the resource from a sender account (e.g., a previous owner of the resource). In some embodiments, and where the resource is an account comprising monetary funds, the resource tracking and logging system may identify the owner of the resource as the owner of the account. For instance, and where the resource tracking and logging system identifies each of the resources with a current owner as a recipient account, the resource tracking and logging system may generate a plurality of the distributed ledgers that the recipient account currently owns, where the recipient account may have received the resource from a sender account. In this manner, the resource tracking and logging system may track the resources and the associated resource transfers to the recipient account identifier.

In some embodiments, and as shown in block 408, the process flow 400 may include the step of updating the plurality of distributed ledgers associated with the recipient account identifier based on a plurality of resource transfers to the recipient account from a plurality of sender accounts. By way of non-limiting example, the resource tracking and logging system may update the distributed ledgers associated with the recipient accounts (e.g., comprising the recipient account identifiers in at least one entry or block of the distributed ledger) based on each of the received resource transfers made to the recipient account from a plurality of sender accounts. In this manner, the resource tracking and logging system may track each of the resource transfers to the recipient account and update the distributed ledgers owned by the recipient account.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for tracking and logging resource transfers, the system comprising:
   a memory device with computer-readable program code stored thereon;
   at least one processing device operatively coupled to the at least one memory device and the at least one communication device, wherein executing the computer-readable code is configured to cause the at least one processing device to:
   generate, by the at least one processing device, a virtual distributed ledger associated with a resource identifier, wherein the resource identifier is associated with a metaverse resource rendering of a real-world resource;
   generate, by the at least one processing device, a real-world distributed ledger of the real-world resource associated with the resource identifier;
   receive, at a network associated with the at least one processing device, a resource transfer associated with the resource identifier, the resource transfer comprising a virtual transaction between a sender account and a recipient account in a metaverse environment of the metaverse resource or in a real-world environment of the real-world resource;
   update, by the at least one processing device, the virtual distributed ledger and the real-world distributed ledger based on the resource transfer in the metaverse environment or in the real-world environment in real time and in parallel;
   generate, by the at least one processing device, a resource token based on the virtual distributed ledger and the real-world distributed ledger, wherein the resource token is used in the virtual transaction, the resource token comprising a virtual resource associated with a current resource of the resource identifier;
   track, by the at least one processing device, the virtual transaction;
   generate, by the at least one processing device, an updated resource token comprising a portion of the virtual resource, wherein the portion of the virtual resource is based on the virtual transaction of the virtual resource;
   update the distributed ledger based on the portion of the virtual resource;
   automatically configure, on a graphical user interface display of a user device associated with the recipient account, a resource token interface comprising the resource token; and
   generate a resource transfer interface to configure a graphical user interface of a user device associated with at least one of a sender account or a recipient account, wherein the resource transfer interface comprises data associated with the resource transfer.

2. The system of claim 1, wherein the resource transfer is a real-world transaction.

3. The system of claim 1, wherein the distributed ledger is a federated distributed ledger, the federated distributed ledger comprising access by a plurality of resource transfer entities each comprising access privileges to update the federated distributed ledger.

4. The system of claim 1, wherein the processing device is further configured to:
   generate a plurality of distributed ledgers associated with a sender account identifier, the plurality of distributed ledgers associated with the sender account identifier comprising data of a plurality of resources of the sender account; and
   update the plurality of distributed ledgers associated with the sender account identifier based on a plurality of resource transfers from the sender account to a plurality of recipient accounts.

5. The system of claim 1, wherein the processing device is further configured to:
   generate a plurality of distributed ledgers associated with a recipient account identifier, the plurality of distributed ledgers associated with the recipient account identifier comprising data of a plurality of resources of the recipient account; and
   update the plurality of distributed ledgers associated with the recipient account identifier based on a plurality of resource transfers to the recipient account from a plurality of sender accounts.

6. A computer program product for tracking and logging resource transfers, wherein the computer program product comprises at least one non-transitory computer-readable medium having computer-readable program code portions embodied therein, the computer-readable program code portions which when executed by a processing device are configured to cause the processor to:
   generate, by the processing device, a virtual distributed ledger associated with a resource identifier, wherein the resource identifier is associated with a metaverse resource rendering of a real-world resource;
   generate, by the processing device, a real-world distributed ledger of the real-world resource associated with the resource identifier;
   receive, at a network associated with the processing device, a resource transfer associated with the resource identifier, the resource transfer comprising a virtual transaction between a sender account and a recipient account in a metaverse environment of the metaverse resource or in a real-world environment of the real-world resource;
   update, by the processing device, the virtual distributed ledger and the real-world distributed ledger based on the resource transfer in the metaverse environment or in the real-world environment in real time and in parallel;
   generate, by the at least one processing device, a resource token based on the virtual distributed ledger and the real-world distributed ledger, wherein the resource token is used in the virtual transaction, the resource token comprising a virtual resource associated with a current resource of the resource identifier;
   track, by the at least one processing device, the virtual transaction;
   generate, by the at least one processing device, an updated resource token comprising a portion of the virtual resource, wherein the portion of the virtual resource is based on the virtual transaction of the virtual resource;
   update the distributed ledger based on the portion of the virtual resource;

automatically configure, on a graphical user interface display of a user device associated with the recipient account, a resource token interface comprising the resource token; and generate a resource transfer interface to configure a graphical user interface of a user device associated with at least one of a sender account or a recipient account, wherein the resource transfer interface comprises data associated with the resource transfer.

7. The computer program product of claim 6, wherein the resource transfer is a real-world transaction.

8. The computer program product of claim 6, wherein the distributed ledger is a federated distributed ledger, the federated distributed ledger comprising access by a plurality of resource transfer entities each comprising access privileges to update the federated distributed ledger.

9. A computer-implemented method for tracking and logging resource transfers, the computer-implemented method comprising:

generating, by a processing device, a virtual distributed ledger associated with a resource identifier, wherein the resource identifier is associated with a metaverse resource rendering of a real-world resource;

generating, by the processing device, a real-world distributed ledger of the real-world resource associated with the resource identifier;

receiving, at a network associated with the processing device, a resource transfer associated with the resource identifier, the resource transfer comprising a virtual transaction between a sender account and a recipient account in a metaverse environment of the metaverse resource or in a real-world environment of the real-world resource;

updating, by the processing device, the virtual distributed ledger and the real-world distributed ledger based on the resource transfer in the metaverse environment or in the real-world environment in real time and in parallel;

generating, by the processing device, a resource token based on the virtual distributed ledger and the real-world distributed ledger, wherein the resource token is used in the virtual transaction, the resource token comprising a virtual resource associated with a current resource of the resource identifier;

tracking, by the processing device, the virtual transaction;

generating, by the processing device, an updated resource token comprising a portion of the virtual resource, wherein the portion of the virtual resource is based on the virtual transaction of the virtual resource;

updating the distributed ledger based on the portion of the virtual resource;

automatically configuring, on a graphical user interface display of a user device associated with the recipient account, a resource token interface comprising the resource token; and generating a resource transfer interface to configure a graphical user interface of a user device associated with at least one of a sender account or a recipient account, wherein the resource transfer interface comprises data associated with the resource transfer.

10. The computer-implemented method of claim 9, wherein the resource transfer is a real world transaction.

* * * * *